UNITED STATES PATENT OFFICE.

LEWIS FRANCIS AND CYRUS H. LOUTREL, OF NEW YORK, N. Y., ASSIGNEES OF LEWIS FRANCIS, OF SAME PLACE.

IMPROVED COMPOSITION OF MATTER.

Specification forming part of Letters Patent No. 41,887, dated March 8, 1864; Reissue No. 1,772, dated September 27, 1864; Reissue No. 1,886, dated February 28, 1865.

*To all whom it may concern:*

Be it known that LEWIS FRANCIS, of the city, county, and State of New York, has invented, made, and applied to use a new and useful Composition of Matter; and we do declare the following to be a full, clear, and correct description of the same, reference being had to the accompanying specimens.

The nature of the invention consists in combining glue, glycerine, and sugar, or any other saccharine matter, to form a new and useful composition of matter for various purposes.

In making the improved composition the ingredients employed are combined in about the following proportions, namely: glue, fifteen (15) pounds; glycerine, thirty (30) pounds; sugar or other saccharine matter, seven (7) pounds. The glue is first soaked in water for about five (5) minutes, in order that it, (the glue,) when added to the glycerine, may be thoroughly incorporated with it. The glycerine is placed in a steam-kettle and heated to a temperature of about 200° Fahrenheit, and the glue and sugar or other saccharine matter employed are added gradually to the glycerine, the latter being kept well stirred until all the ingredients have been added and thoroughly incorporated with the glycerine.

The composition thus formed may be cast into thin sheets or cakes of any desired form, ready for commerce. The sheets or cakes are exposed to the air several days, in order that any water remaining in the composition may be thoroughly evaporated; or a vacuum-pan may be used for this purpose. By this last process all liability of the composition to shrink from the presence of water or moisture is obviated. The composition is then ready for sale, or for remelting and casting into any desired form, and can be recast from time to time.

The improved composition thus made will be found particularly applicable to the manufacture of a superior article of printers' inking-rollers, to the lining of barrels or vessels for petroleum, fluids, and semi-fluids, as well as dry substances, also for various purposes where elasticity is required, for the taking of impressions in various ways, for the formation of molds and casts, and for various other purposes.

We do not wish to be understood as intending to confine ourselves to the use of the ingredients specified, in the proportions specified, as we are well aware that these proportions may be in some cases advantageously varied. Neither do we propose to confine ourselves to the use of glue, as other gelatines may be substituted for glue, and various gums, resins, and bitumen may be employed in part, and the composition thereby improved for some purposes, care being taken that when any one of the gums, resins, or bitumen be used, the same shall be first dissolved by its proper solvent before being added in the manufacture of the composition.

Having thus described the invention, what we claim as new, and desire to secure by Letters Patent, is—

Combining glue, glycerine, and sugar, or any other saccharine matter, to form a new and useful composition of matter for various purposes.

LEWIS FRANCIS.
CYRUS H. LOUTREL.

In presence of—
A. SIDNEY DOANE,
W. D. EVERITT.